US012772193B2

(12) United States Patent
Singh et al.

(10) Patent No.: US 12,772,193 B2
(45) Date of Patent: Oct. 20, 2026

(54) SYSTEM AND METHOD FOR OPTICAL LOCALIZATION

(71) Applicant: Kabushiki Kaisha Toshiba, Tokyo (JP)

(72) Inventors: Jagdeep Singh, Bristol (GB); Peizheng Li, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 464 days.

(21) Appl. No.: 18/352,987

(22) Filed: Jul. 14, 2023

(65) Prior Publication Data

US 2025/0020758 A1 Jan. 16, 2025

(51) Int. Cl.

| | |
|---|---|
| ***H04W 64/00*** | (2009.01) |
| ***H04B 10/116*** | (2013.01) |
| ***H04W 4/02*** | (2018.01) |
| ***H04W 4/024*** | (2018.01) |
| ***H04W 4/029*** | (2018.01) |
| ***H04W 4/33*** | (2018.01) |

(52) U.S. Cl.

CPC ........... *H04W 64/00* (2013.01); *H04B 10/116* (2013.01); *H04W 4/02* (2013.01); *H04W 4/024* (2018.02); *H04W 4/029* (2018.02); *H04W 4/33* (2018.02)

(58) Field of Classification Search

CPC ....... H04W 64/00; H04W 4/02; H04W 4/024; H04W 4/029; H04W 4/33; G01S 2205/01; G01S 5/16; H04B 10/116

See application file for complete search history.

(56) References Cited

U.S. PATENT DOCUMENTS

| | | | | |
|---|---|---|---|---|
| 10,251,027 | B2 | 4/2019 | Zhang et al. | |
| 10,637,575 | B2 | 4/2020 | Zhang et al. | |
| 2016/0197675 | A1* | 7/2016 | Ganick | H04N 23/56 398/172 |
| 2018/0176739 | A1* | 6/2018 | Zhang | H04W 4/33 |
| 2018/0219623 | A1* | 8/2018 | Bitra | H04B 10/116 |
| 2019/0101984 | A1* | 4/2019 | Talati | G06N 20/00 |
| 2022/0007139 | A1 | 1/2022 | Li et al. | |

(Continued)

OTHER PUBLICATIONS

Zhang, Chi, and Xinyu Zhang. "LiTell: Robust Indoor Localization Using Unmodified Light Fixtures." Proceedings of the 22nd Annual International Conference on Mobile Computing and Networking. New York, NY, USA: ACM, 2016. 230-242. Web (Year: 2016).*

(Continued)

*Primary Examiner* — Monica T Taba

(74) *Attorney, Agent, or Firm* — Oblon, McClelland, Maier & Neustadt, L.L.P.

(57) ABSTRACT

A method of detecting a location of a mobile unit in an environment lit by a plurality of light sources, the method comprising, the mobile unit using a light sensor, obtains a plurality of pieces of spectral information of visible light the mobile unit is exposed to, the spectral information being only obtained at a limited number of predetermined wavelength. The method further comprises comparing the determined signature to previously stored signatures of light sources and identifying a light source that has the most similar signature to the determined signature and estimating a current location of the mobile unit as being at or proximate to a known installation location of the identified light source.

17 Claims, 10 Drawing Sheets

(56) References Cited

U.S. PATENT DOCUMENTS

| | | | | |
|---|---|---|---|---|
| 2023/0133978 | A1 | 5/2023 | Raza et al. | |
| 2025/0301440 | A1* | 9/2025 | Lindquist | H04W 64/00 |

OTHER PUBLICATIONS

Singh et al., "HueSense: Featuring LED Lights Through Hue Sensing", Morse '22, Oct. 21, 2022, pp. 19-24.

Singh et al., "Detecting and Controlling Smart Lights with LiTalk", Morse '22, Oct. 21, 2022, pp. 13-18.

Singh et al., "Passive Visible Light Positioning Systems: A Overview", LOIT '20. Sep. 21, 2020, pp. 48-53.

Zhang et al., "LiTell: Robust Indoor Localization Using Unmodified Light Fixtures", MobiCom '16, Oct. 3-7, 2016, pp. 230-242.

Kuo et al., "Luxapose: Indoor Positioning with Mobile Phones and Visible Light", MobiCom '14, Sep. 7-11, 2014, pp. 447-458.

Zhang et al., "Pulsar: Towards Ubiquitous Visible Light Localization". MobiCom '17, Oct. 16-20, 2017, pp. 208-221.

"Color Sensor: S9706", Hamamatsu, retrieved from at: https://www.hamamatsu.com/eu/en/product/optical-sensors/photo-ic/color-sensor/rgb-color-sensor/S9706.html, Jul. 2021, pp. 1-6.

Li et al., "Wireless Localisation in WiFi using Novel Deep Architectures". 2020 25$^{th}$ International Conference on Pattern Recognition (ICPR), Jan. 10-15, 2021, pp. 6251-6258.

Li et al., "BmmW: A DNN-based Joint BLE and mmWave Radar System for Accurate 3D Localization", Bristol Research & Innovation Laboratory, 2023, pp. 1-8.

Singh et al., "BLoB: Beating-based Localization for Single-antenna BLE Devices", Proceedings of the In Proceedings of the 2023 International Conference on Embedded Wireless Systems and Networks, 2023, pp. 1-13.

Zhang et al., "Extending Mobile Interaction Through Near-Field Visible Light Sensing", MobiCom '15, Sep. 7-11, 2015, pp. 345-357.

* cited by examiner

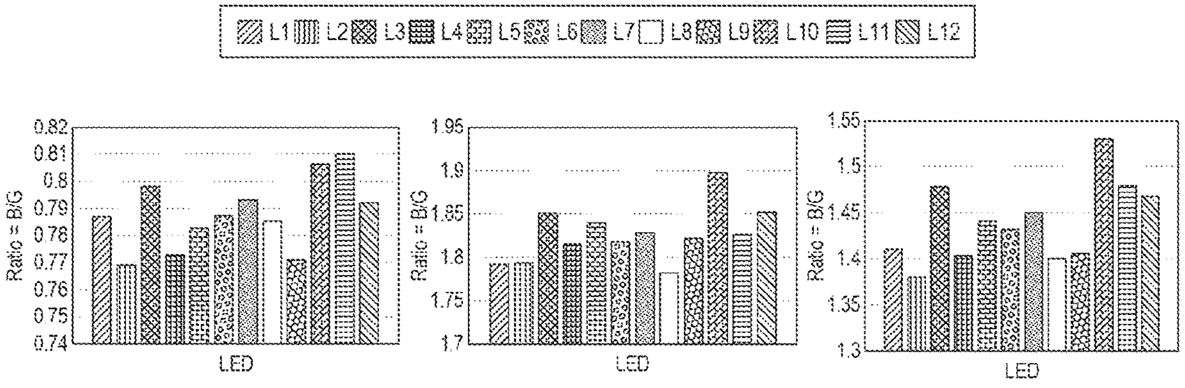
FIG. 1
FIG. 2A
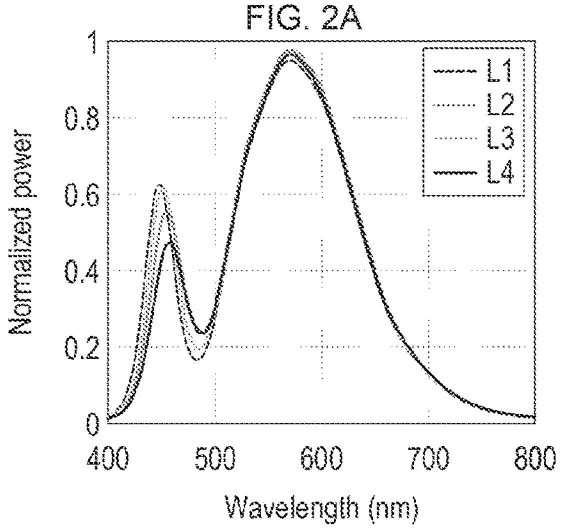
(a) Θ = -45°
FIG. 2B
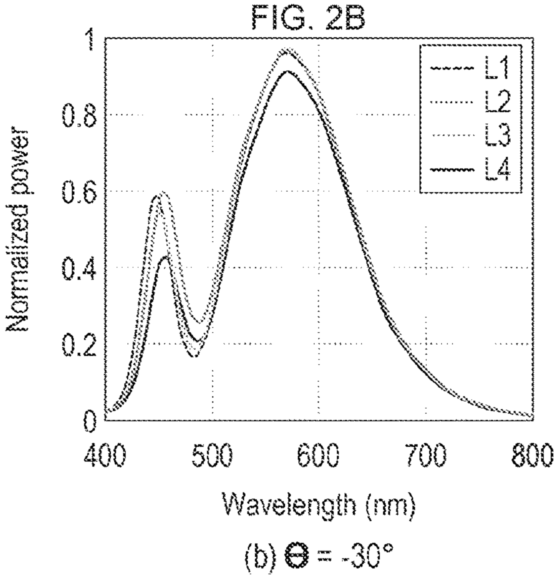
(b) Θ = -30°
FIG. 2C
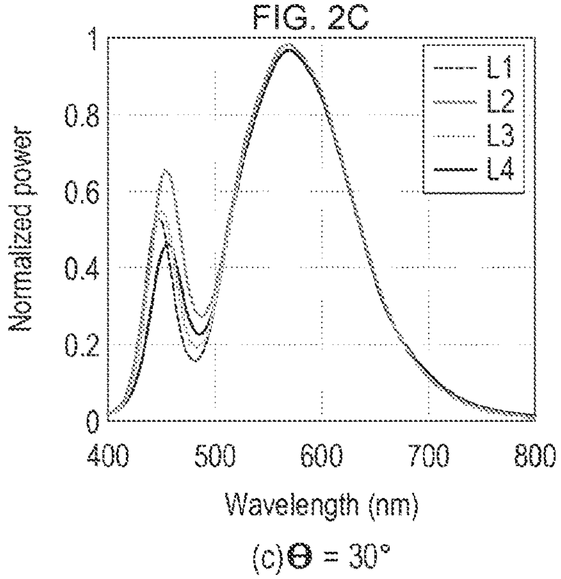
(c)Θ = 30°
FIG. 2D
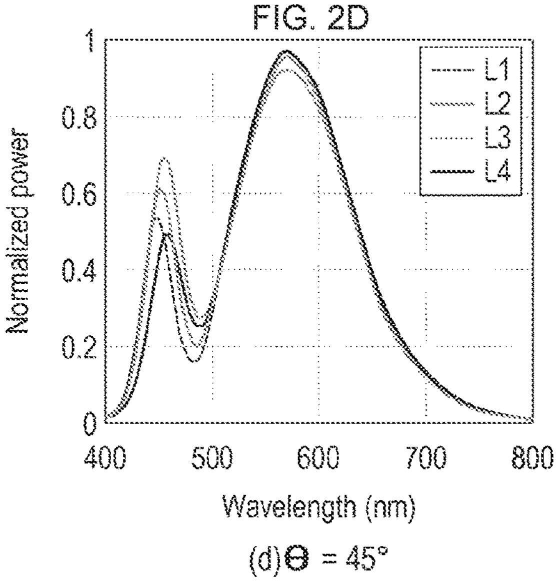
(d)Θ = 45°

SYSTEM AND METHOD FOR OPTICAL LOCALIZATION

FIELD OF THE INVENTION

The present invention generally relates to a system and method for localization and particularly to a system and method that utilises predetermined wavelengths of a light source for localization.

BACKGROUND

Existing Radio Frequency (RF)-based localization systems leveraging communication technologies e.g., Wi-Fi, Bluetooth, and RFID deployed in the industries are inherently susceptible to multipath fading, which limits the achievable localization accuracy, especially in the indoor environment. The current RF-based solutions are still lacking in achieving high localization accuracy using the low-power and cost-effective devices.

In contrast, the location awareness services provided by optical communication technology such as visible light communication technology, termed Visible Light Positioning (VLP), have attracted much attention in the past decade because of its enormous advantages compared to conventional RF technology, including the use of a wide unregulated spectrum, multipath-free propagation, security and inexpensive receivers, i.e., photodetectors (PDs), and for being able to provide high accuracy geolocation. VLP has a broad range of potential applications, such as service robot navigation that may clean, monitor or assist in homes, offices, retail, warehouse and hospital environments, location-based promotion services, to name a few.

The technology employs light sources such as Light Emitting Diodes (LEDs) or fluorescent lights as a transmitter and a light sensing device such as a camera or PDs as a receiving device. In some VLP setups, the location beacons are transmitted from the light source units and received by the light sensing units, enabling the determination or extraction of location coordinates. However, the commercial availability of such systems is hampered by the requirement of modulated light sources which in turn requires changes to existing lighting infrastructure.

Arrangements of the embodiments will be understood and appreciated from the following detailed description, made by way of example and taken in conjunction with the drawings.

BRIEF DESCRIPTION OF THE FIGURES

FIG. 1 shows measured RGB power ratio comparison among 12 commodity LEDs of the same model and brand;

FIGS. 2A to 2D show smoothed detected LED spectra using high-spectrum resolution spectrometer at different incident angle (θ);

DETAILED DESCRIPTION

Figure 3:
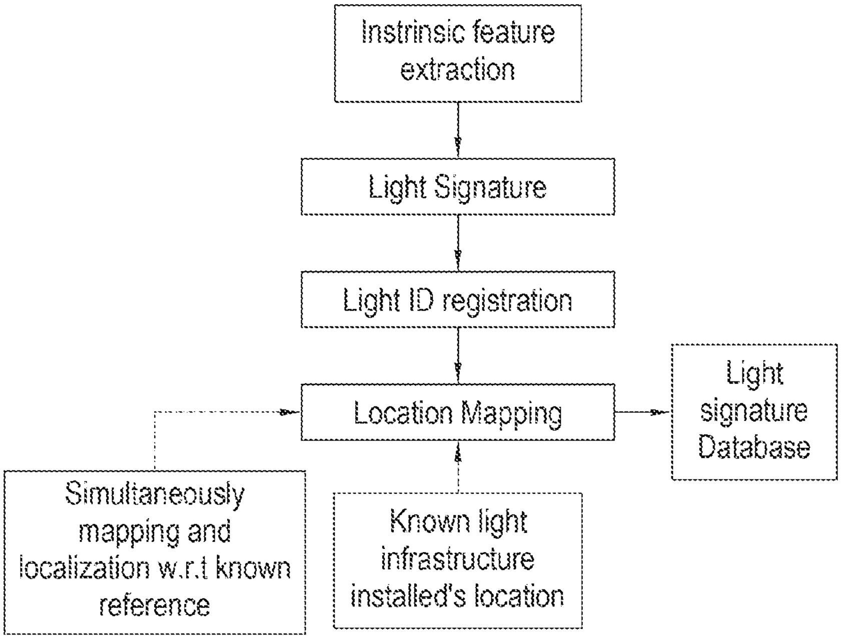
FIG. 3 shows a flow chart illustrating the mapping procedure of light signatures with the installed location of light sources.

According to an embodiment, there is provided a method of detecting a location of a mobile unit in an environment lit by a plurality of light sources comprising, the mobile unit uses a light sensor, obtains a plurality of pieces of spectral information of visible light the mobile unit is exposed to, the spectral information being only obtained at a limited number of predetermined wavelength. The method further comprises comparing the determined signature to previously stored signatures of light sources and identifying a light source that has the most similar signature to the determined signature and estimating a current location of the mobile unit as being at or proximate to a known installation location of the identified light source.

In an embodiment the light sensor is a single pixel sensor.

In an embodiment the previously stored signatures are stored locally in the mobile unit.

In an embodiment the light sensor comprises a sensing element that is directed in a vertical upward direction and at least one further sensing element that is oriented in a direction at an acute angle relative to the vertical upward direction and wherein the at least one further sensing element senses light emitted by a light source adjacent to the identified light source, the mobile unit configured to reduce a size of the estimated current location based on the senses light emitted by a light source adjacent to the identified light source.

In an embodiment the spectral information obtained at a limited number of predetermined wavelength is obtained only at a red, green and a blue wavelength or at red, green and a blue wavelength bands.

In an embodiment the relationship between the plurality of the obtained pieces of spectral information is a difference between or a ratio of two spectral powers obtained at two different of the wavelength.

In an embodiment the mobile unit has access to a trained machine learning model configured to output location information within an area illuminated by the identified light source, wherein estimating a current location includes using the trained machine learning model to generate location information of the location of the mobile unit within an area illuminated by the identified light source.

According to an embodiment, there is provided a method of detecting a location of a mobile unit in an environment lit by a plurality of light sources comprising, the mobile unit uses a light sensor, obtains a plurality of pieces of spectral information of visible light the mobile unit is exposed to, the spectral information being only obtained at a limited number of predetermined wavelength. The method further comprises generating a location estimate by inputting, as only visible light information, the obtained plurality of pieces spectral information into a trained machine learning model.

In an embodiment the machine learning model if further trained to base location estimates on radiofrequency information in addition to the visible light information and wherein generating the location estimate further comprises inputting radiofrequency information sensed at a current location of the mobile unit by an RF sensor of the mobile unit into the machine learning model.

According to an embodiment, there is provided a method of training a machine learning model comprising training a model capable to provide localization information based on radiofrequency measurements further using visible light information detected at a location and location information of the location at which the visible light information was detected.

In an embodiment the method further comprises training the model to be capable to provide localization information based on radiofrequency measurements obtained at a measurement locations and on location information of the measurement locations.

According to an embodiment, there is provided a mobile unit comprising a light sensor, the mobile unit configured to obtain a plurality of pieces of spectral information of visible light the mobile unit is exposed to, the spectral information being only obtained at a limited number of predetermined wavelength, compare the determined signature to previously stored signatures of light sources and identifying a light source that has the most similar signature to the determined signature and estimates a current location of the mobile unit as being at or proximate to a known installation location of the identified light source.

In an embodiment the light sensor comprises a sensing element that is directed in a vertical upward direction and at least one further sensing element that is oriented in a direction at an acute angle relative to the vertical upward direction and wherein the at least one further sensing element senses light emitted by a light source adjacent to the identified light source, the mobile unit configured to reduce a size of the estimated current location based on the senses light emitted by a light source adjacent to the identified light source.

In an embodiment the spectral information obtained at a limited number of predetermined wavelength is obtained only at a red, green and a blue wavelength or at red, green and a blue wavelength bands.

In an embodiment the relationship between the plurality of the obtained pieces of spectral information is a difference between or a ratio of two spectral powers obtained at two different of the wavelength.

In an embodiment the mobile unit has access to a trained machine learning model configured to output location information within an area illuminated by the identified light source, wherein estimating a current location includes using the trained machine learning model to generate location information of the location of the mobile unit within an area illuminated by the identified light source.

According to an embodiment, there is provided a mobile unit comprising a light sensor and configured to obtain a plurality of pieces of spectral information of visible light the mobile unit is exposed to, the spectral information being only obtained at a limited number of predetermined wavelength generate a location estimate by inputting, as only visible light information, the obtained plurality of pieces spectral information into a trained machine learning model.

In an embodiment the machine learning model if further trained to base location estimates on radiofrequency information in addition to the visible light information and wherein generating the location estimate further comprises inputting radiofrequency information sensed at a current location of the mobile unit by an RF sensor of the mobile unit into the machine learning model.

According to an embodiment, there is provided a mobile unit comprising the machine learning model trained according to any of the above described methods of training.

In a low-power, cheap, easily integrable and computationally inexpensive passive VLP system for IoT devices. The purpose is to offer ubiquitous indoor location tracking and navigation capabilities. Furthermore, it can improve the localization performance of existing RF-based localization systems by fusing this approach leveraging machine learning techniques.

It was realised that light sources, including LEDs, have slightly different colour spectra and different composites of dominant colours in light emission pattern, that, although not readily noticeable by the human eye, can be detected by light sensing device such as colour sensors, suggesting that a light source can be uniquely identified by its spectrum in its normal operation mode, without the need to modulate the operating mode or otherwise modify the light source. Put in other words, it was realised that off-the shelve light sources can be uniquely identified by detecting properties of the colour spectra they produce.

The wavelength of light emitted by LEDs, and thus its colour, depends on the materials forming the LED chip. Due to unavoidable manufacturing imperfections, e.g., the variations in the phosphor coating thickness and the non-uniformity, of the glass-coating creates different radiant/photonic attributes of the light originate such as the change in emissive power and colour temperature. These imperfections make LEDs' emissive power for particular (dominant) wavelengths different, which motivates the design of this invention.

In the case of white LED light, for example, the three dominant emitted wavelengths are $\lambda_R$, $\lambda_G$, and $\lambda_B$ at Red (R), Green (G), and Blue (B) channels. White LED light is often created using phosphor conversion or RGB mixing. In phosphor conversion, blue LED chips are used as the primary elements, with a layer of phosphor coating applied to produce white light. Alternatively, RGB mixing involves using separate red, green, and blue LED chips to create a white light source.

The composition and thickness of the phosphor layer determine the colour temperature and quality of the emitted light. Manufacturing errors or variations in the glass, phosphor coating, quality can lead to differences in the power emitted at dominant wavelengths, even among LEDs from the same vendor. This variation around the power at dominant wavelengths varies among different light sources, providing a unique light signature, which is one of the embodiments in this invention.

As will be appreciated from the above, a unique light signature of a given light source can be obtained by determining the power provided by the light source at a plurality of predetermined wavelengths. In an embodiment a digital signature of an individual light source is calculated by determining at least one of a ratio of the powers provided by the light source at two or more of the plurality of predetermined wavelengths and a difference of the powers provided by the light source at two or more of the plurality of predetermined wavelengths. Determining the ratio and/or difference between the power provided by a light source at various, predetermined wavelengths allows detecting the thus determined signature of the light source independent from the distance or angle between the light source and a sensor detecting the signature. FIG. 1 shows the obtained power ratios/light signatures for 12 LEDs under Line-of-Sight (LoS) scenarios in a lab environment, clearly indicating that individual light sources/LEDs can be distinguished using the illustrated signatures.

FIGS. 2A to 2D show detected LED spectra using high-spectrum resolution spectrometer at different incident angle (θ). As can be seen from these figures, the spectral distribution contained in light from light sources L1 to L4 is effectively independent of the incidence angle of the light upon a sensor. As a result, the ratio or difference of power at dominant wavelengths (i.e., $\lambda_R$, $\lambda_G$, and $\lambda_B$, in case of the white LED lights) at different positions remains constant. Whilst the intensity of light received with changing incidence angle or distance of a sensor from the light source or other factors such as shadows and blockage may change, the digital signatures described herein will remain constant over distance or incidence angle.

FIG. 3 shows a method of fingerprint/ID collection/mapping the ID's of several light sources in an installation. A mobile unit carrying sensors that are configured to extract the spectral power of received light at predetermined wavelength moves throughout the installation and senses the light it receives from light sources in the installation of light sources. Based on the received light the signature of the light is then determined in the manner described below and combined with location information relating to the light signature. This location information can be derived based on a tracked current location of the mobile unit and/or from information of the known location of installation of the identified light source. Automated Guided Vehicles (AGVs) can assist in mapping the area while extracting the light source fingerprints. The starting position can be considered as the reference position or origin, and coordinates for subsequent light sources can be assigned based on the starting light source. This assignment can be facilitated using a combination of other sensors on the AGVs, such as IMU (Inertial Measurement Unit) and dead reckoning techniques, etc. In addition, since the lighting unit is installed in a fixed position and there is a predetermined gap between the lighting units, any potential drift over time (e.g., caused by wheel misalignment, friction etc.) can be rectified by utilizing the peak power received from two light sources. The peak power is obtained only when the sensor is precisely positioned beneath the light source. To determine if there is any drift, the distance travelled by the AGVs to receive the two power peaks should be equal to the inter-separation gap between the lighting units. If the distances do not match, it indicates a drift that can be corrected. By utilizing these techniques, a robust mapping of light sources and their corresponding coordinates can be established within the designated area, ensuring accurate localization and tracking capabilities. The database can be stored on a local, edge device or on a cloud.

In an embodiment the ID $L_i$ of the $i_{th}$ LED is calculated using the following tuple or any possible combination of the power ratio or difference values:

$$L_i:\left\langle \frac{P_B}{P_G}, \frac{P_G}{P_R}, \frac{P_B}{P_R} \right\rangle \text{ or } L_i:\langle P_B - P_G, P_G - P_R, P_B - P_R \rangle$$

where i=1 . . . . N, N is the total number of LEDs and $P_{R_i}$, $P_{G_i}$ and $P_{B_i}$ are the received spectral power at R, G, B channels, respectively.

In embodiments, unique IDs are assigned to light sources using single or multiple sensors. For each sensor the power values at dominant wavelengths are extracted, for example in case of white light source at red (R), green (G), and blue (B) wavelengths. Preferably but not essentially the extracted values are stored in a database. The use of multiple sensors increases the effectiveness of differentiation from other light sources, though this is not essential.

Using these extracted power values, a unique fingerprint/ID is calculated for each light source based on the combination of power received at dominant wavelengths for example: ratios of power at B to power at G, power at G to power at R, and power at B to power at R or the difference in power considering different possible combination power at dominant wavelengths. Preferably but not essentially these calculated fingerprints/IDs are stored in a database for further use.

Mathematically, for each sensor $S_j$, where j∈{1,2,3}, the power at R, G, B wavelengths or channels for each light $L_i$, denoted as $P_{R_{ij}}$, $P_{G_{ij}}$, $P_{B_{ij}}$, where the i∈{1, 2, . . . , N} and N is the total number of light units present in a given room. These data store the ID of the light source in a database, for example as:

$$L_{ij}:\left\langle \frac{P_{B_{ij}}}{P_{G_{ij}}}, \frac{P_{G_{ij}}}{P_{R_{ij}}}, \frac{P_{B_{ij}}}{P_{R_{ij}}} \right\rangle$$

so that each light source $L_i$ is uniquely identifiable by a number of IDs $L_{ij}$ that corresponds to the number of sensors used when acquiring the IDs. It will be appreciated that the light source can still be identified if a different number of sensors is used on a mobile unit, as either only a sub-set of the generated signatures (as applicable to a (lower) number of sensors) are used or as sensor signals for which no matching signatures are available can remain unused.

In one embodiment the power provided by a light source at a predetermined wavelength is determined inexpensively using off-the-shelf single pixel hue sensors that are each sensitive at one of the respective predetermined wavelength or off-the-shelf hue sensors that are sensitive more than one of the respective predetermined wavelength, preferably to three (e.g. R, G and B) wavelengths. One suitable sensor is the Hamamatus S9076. Such sensors can be easily deployed into the tiniest IoT devices, and they can directly extract the dominant wavelengths of white lights from LED bulbs. It will of course be appreciated that embodiments are not limited hereto and that other sensors, such as high-resolution spectrometers may be used instead, although, advantageously, doing so is not mandatory. If a sensor that senses light at a bandwidth that is broader than a narrow band that represents the desired predetermined wavelength is used then on power received in the narrow band(s) that represent(s) the desired predetermined wavelength(s) are used for determining the signature of the light source.

As an example, in an embodiment the dominant wavelengths of white LED sources, the Red (R), Blue (B), Green (G) channels are sensed. In the embodiment, a colour sensor equipped with elements designed to be sensitive at these wavelengths, is employed. An operational amplifier can be utilized in the embodiment to convert the light falling on these sensors into an electric current. To further process and analyse, a digital-to-analogue converter may be employed in the embodiment to convert these power values into a digital representation of the power received.

In an embodiment the unique light signatures extracted using sensor module is formed for each light units in a given area. The thus determined light signatures are stored on the local device that seeks to determine its position relative to the light sources, on edge devices or a cloud database to allow offering further location services. In one embodiment, the light signatures are acquired by placing sensors acquiring the light signatures exactly beneath the lighting unit. In one embodiment the sensors determining the light signature are the sensors carried by a device that is configured to use the determined light signatures for determining its own position relative to the light sources. In another embodiment the light signatures are acquired using different sensors. It one embodiment the light signature of a light source is determined by the manufacturer of the light source at the end of the manufacturing process and provided to a buyer of the light source.

Figure 4:
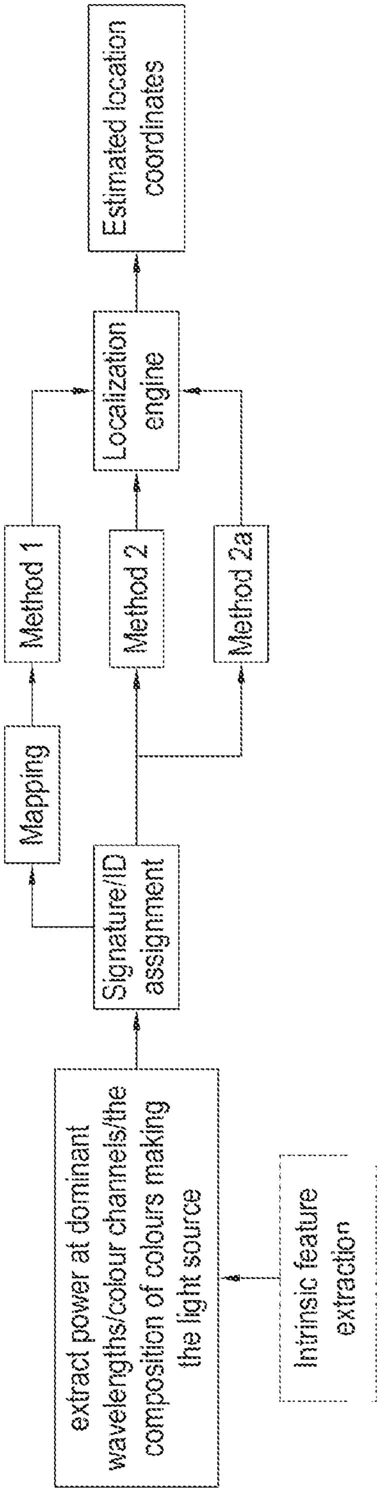
FIG. 4 shows a flow chart of an embodiment.

FIG. 4 shows a flowchart according to an embodiment. In a first step, sensors carried by a mobile unit extracted the intrinsic features of the light sensed in the manner described herein. Such extraction may be based, for example, on the power the light source has at particular wavelengths/in particular colour channels or on the composition of colours that up make the light received from the light source. Based on the extracted intrinsic features the signature of the light source from which the light has been received is determined. In one possible method an approximate position of the mobile unit is determined in a mapping step. In either case, detailed input information is provided to a localization engine, enabling the mobile unit to determine its position with increased accuracy when compared to the approximate mapping performed based on the light signature alone. Three different methods of providing the detailed input to the lookout litigation engine are indicated in FIG. 4 and explained in more detail herein.

In an embodiment light signatures are identified using multiple sensors. Initially a target device carrying the light sensor(s) determines under which light source/LED they are positioned. Thereafter the device determines its precise location under the light source/LED. Some of the light sources may have the same power ratios/differences or approximately negligible differences between the power ratios/differences, at dominant wavelengths i.e., they might carry the same light signatures. This can cause difficulty in determining which light source/LED the device is positioned.

Figure 5:
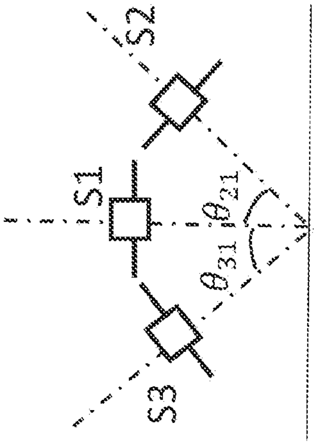
FIG. 5 shows a sensor module design of an embodiment.

The embodiment uses multiple sensors S1 to S3 with different inclination angles $\theta_{21}$ and $\theta_{31}$ relative to each other, as shown in FIG. 5. In an embodiment the sensor module is placed on top of an autonomous vehicle or any device/target whose location is to be determined. The target can also receive the database input from the cloud unit using any wireless technology.

Each of the sensors S1 to S3 is able to independently identify a light signature of a light source. In one embodiment the sensors S1 to S3 are arranged on a target device so that the direction of maximum sensitivity of sensor S1 is vertical. In this arrangement sensors S2 and S3 can be used to detect the light signature of the light source under different angles of incidence. This helps in identifying the light source as it is approached.

In one embodiment the angles $\theta_{21}$ and $\theta_{31}$ may be between ≥30 degrees and ≤60 degrees. More generally, the angles $\theta_{21}$ and $\theta_{31}$ are about the angle the sensors S2 and/or S3 would have to adopt to, in a given installation of a number of light sources in which sensor S1 is directly below one light source, sensors S2 and/or S3 would require so that their direction of maximum sensitivity is in the direction of a light source neighbouring the lights source under which the target device/sensor arrangement is presently located. In the embodiment light source installation information and light source signature are available to a mobile target and may be stored in a memory of the local target. Based on this information the local target can determine its location relative to the light source positions.

In one embodiment (illustrated in the top branch of FIG. 4), lights sources are identified based on the measured fingerprint/ID values at a specific location. The light identification can be done by finding the minimum Euclidean error between the stored LED ID/signature values and newly measured power ratios at dominant wavelengths, denoted as $\tilde{L}$. In particular in the embodiment:

1. At the current location, the fingerprint/ID values for the light source using all sensors are measured. Let $\tilde{L}_{kj}$ denote the measured fingerprint/ID values at location k.
2. The Euclidean error for each light is then calculated by comparing the measured ID values with the stored IDs. At current location k, calculate the Euclidean error as:

$$E_{kj}^{i} = \sqrt{\left(\tilde{L}_{ij}[1] - \tilde{L}_{kj}[1]\right)^2 + \left(\tilde{L}_{ij}[2] - \tilde{L}_{kj}[2]\right)^2 + \left(\tilde{L}_{ij}[3] - \tilde{L}_{kj}[3]\right)^2}$$

3. The minimum error value is then determined for each sensor and it is being keep track of the corresponding light with the minimum error. Calculate the minimum error value for each sensor as $$D_{kj} = \min_i E_{kj}^{i}$$

and store the corresponding argument where the minimum is obtained as $M_{kj}$.
4. For the given location, the light source under which the mobile unit is located is selected as the light source for which the minimum error has been calculated if the minimum error values from all three sensors are different.
5. If the minimum error values from the sensors are the same, the light associated with the first (centre/vertically oriented) sensor is chosen as the predicted light.

Mathematically, for each location k, find the predicted values $P_k$ as:

$$\text{If } M_{k1} \neq M_{\neq k2} \neq M_{k3} \text{ then } P_k = \operatorname{argmin}_j D_{kj}$$

$$\text{else}$$

$$P_k = M_{k1}$$

In another embodiment the search for the minimum Euclidean error with the installed lighting unit is further optimized by incorporating inputs from other sensing units, such as IMU (Inertial Measurement Unit), gyroscope, and the previously detected target location. By leveraging these additional data sources, the search engine can be fine-tuned to improve accuracy and efficiency, resulting in a more precise localization process.

Figure 6:
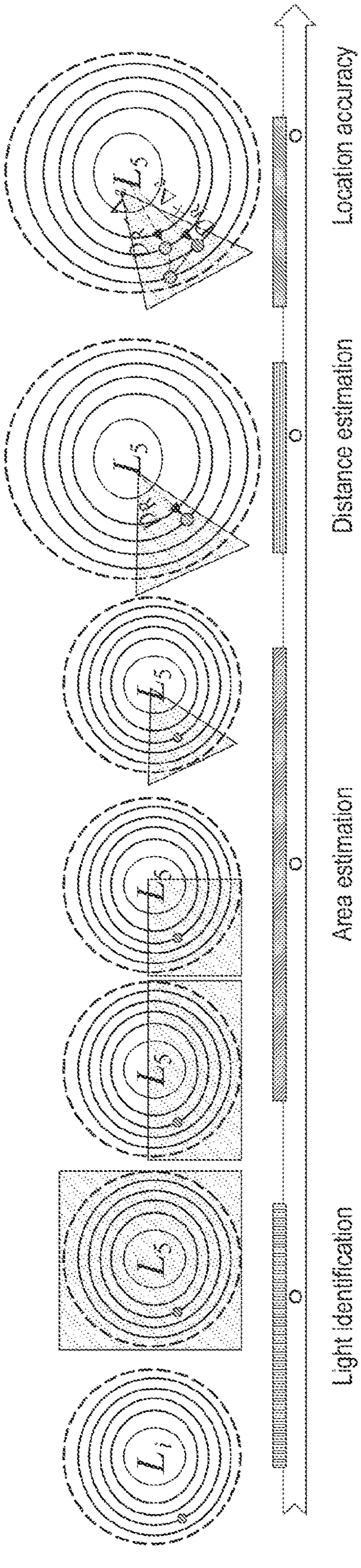
FIG. 6 shows an area illuminated by a light source and changes in the target area within it during localization according to an embodiment.
Figure 7:
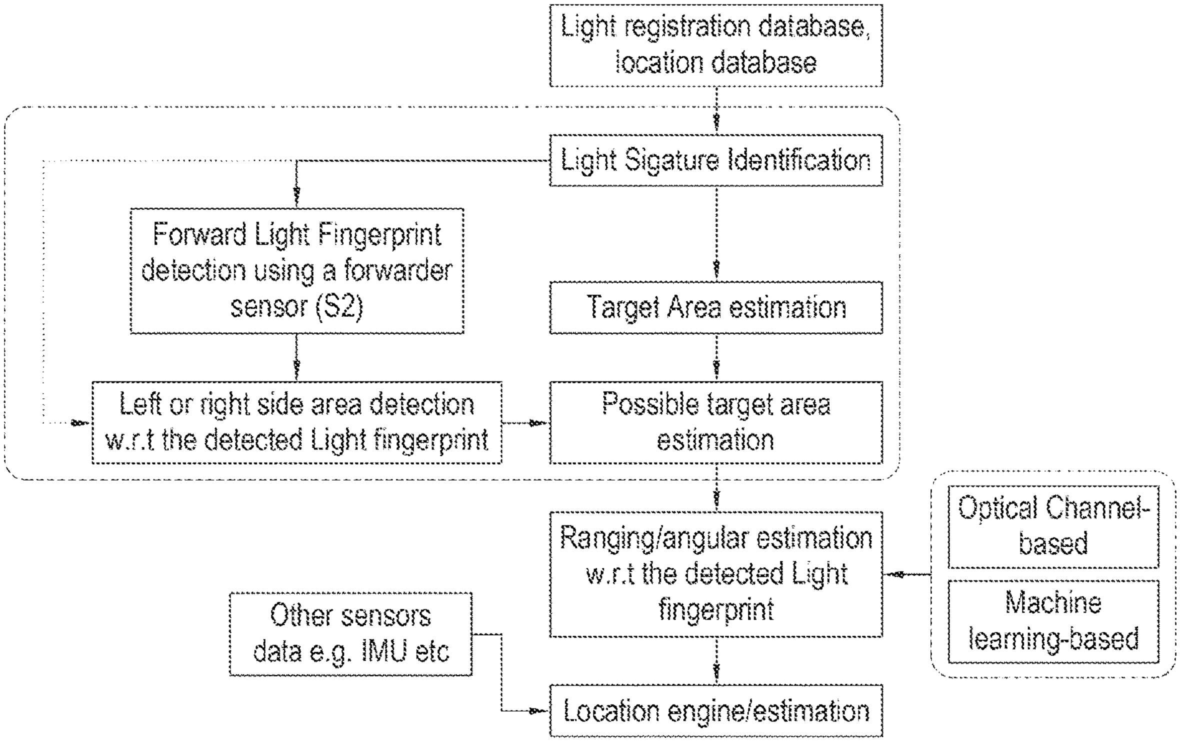
FIG. 7 shows a flow chart outlining a localization Method according to an embodiment.

After identifying the light source, the next step is to determine the location of the light receiver in relation to that light. One example sequence of steps that can be used for this purpose is illustrated in FIGS. 6 and 7. The seven circular areas illustrated in FIG. 6 show an area illuminated by a particular light source $L_i$ at different stages of the location determination process. The leftmost two circular areas simply depict the light source $L_i$ respectively before and after (step "light signature identification in FIG. 7) it has been identified as the light source under which the mobile unit is presently located. The target area estimate step in FIG. 7 produces the target estimate shown in the second circular area from the left in FIG. 6. The rightmost five circular areas relate to determining the receiver's position within that circle with increasing accuracy.

In a first step (FIG. 7: "Forward Light Fingerprint detection using a forward sensor (S2)"), the light spectrum received by a forward looking sensor is analysed. In one embodiment, the forward looking sensor is S2. Based on the light received by this sensor, the minimum Euclidean error in light fingerprints from neighbouring lights is determined using the procedure described above. This process helps to narrow down the search area for the receiver's position to half the detection area, i.e., a semi-circle aligned with the forward direction of the light receiver, as illustrated in the third circular area from the left in FIG. 6.

In a further step (FIG. 7: "Left or right side area detection w.r.t the detected Light fingerprint"), it is determined on which side/direction of the light source, receiver is present in the same manner as discussed in Step 1. In particular, the minimum Euclidean error in light fingerprints from the neighbouring lights to the left and right of the identified light source are determined the side of the light source that provides the smaller error is selected as the quarter of the area illuminated by the light source $L_i$ under which the mobile unit is located. This step helps to determine whether the receiver is on the left or right side of the light source within the semi-circle search area. The fourth circle from the left shows the reduction in the area in which the mobile unit can possible be located to one quarter of the area illuminated by the light source. This reduces the possible target area estimated in FIG. 7, in the manner shown, in subsequent steps in the third and fourth circular areas from the left in FIG. 6.

The forwards sensor S2 is further used in detecting signatures of forwardly located neighbouring light sources and of light sources neighbouring a current light source to the side. The error in the detected the forward and sideways light source signatures respectively is then determined and the area of possible location is halved from the quarter of the illuminated area shown in the fourth circular structure from the left in FIG. 6 to the area shown in the fifth circular structure from the left in FIG. 6, wherein the half of the quarter area that is closest to the light source with the smaller signature detection error.

In one embodiment, during the first and second steps, the search for the minimum Euclidean error with the installed lighting unit is limited to only the light units present around the detected light source. This focused search approach helps streamline the localization process and increases efficiency by considering only the relevant light units in the vicinity of the detected light source.

Figure 8:
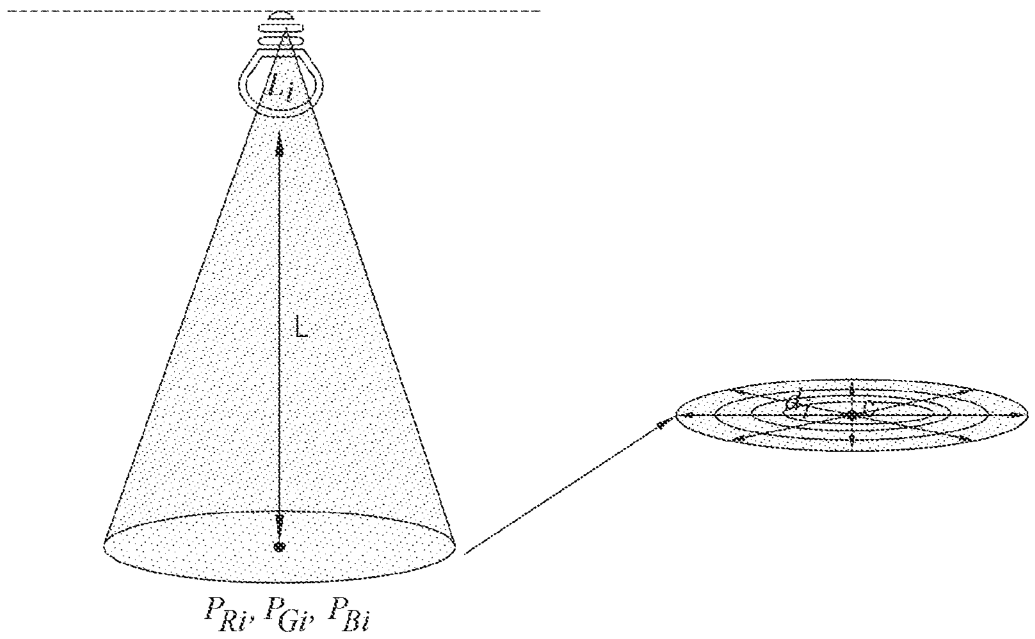
FIG. 8 shows a model adopting light signatures at various positions relative to the center of a light source.

The exact distance of the mobile unit from the centre of the light source/the point of the surface on which the mobile unit travels that receives the maximum amount of light is, in one embodiment, determined based on a machine learning model that has been trained to determine the location of a light sensor relative to the centre/point of maximum illumination of a light source. FIG. 8 illustrates a coordinate system used in one embodiment in this context.

Figure 9:
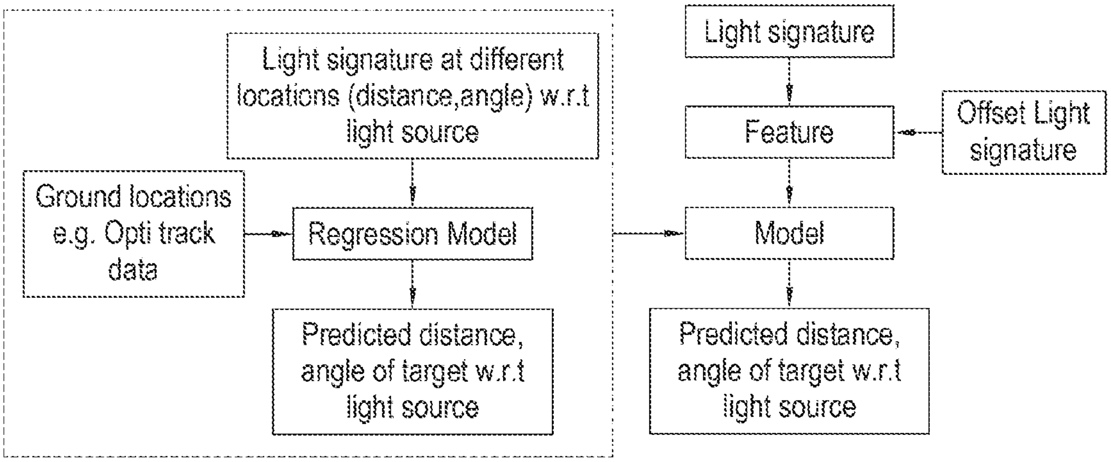
FIG. 9 shows a flowchart for training and testing of a localization model to determine the ranging/angular estimation w.r.t the detected Light fingerprint in an embodiment.

During training (see dashed box on the left hand side of FIG. 9) the mobile unit adopts a number of different positions at various radial distances from and angular positions relative to a central point at which the intensity of the illumination of the light source is at its maximum. In an embodiment the training uses only a single light sensor. In an embodiment the training is performed on a particular type of light source and the acquired model is then used on all other light sources of the same type. For example, training may be performed on a light source having a particular illumination pattern and then used in identifying light sources that have the same illumination pattern. At each adopted training position the localization model (which can be machine learning model like deep neural network, or other mathematical statistical model like linear regression) outputs its estimated position relative to the central point at which the intensity of the illumination of the light source is at its maximum. Each of the actual training positions of the mobile unit is tracked and serves to provide training feedback. Any known and suitable training method, such as regression, may be used for this purpose. This training process enables the model to learn the relationship between the collected signatures/features and the specific locations where they were obtained.

In use, sensor unit acquires a light signal that is to form the basis for determining the radial distance from and angular position relative to the point of the surface on which the mobile unit travels that receives the maximum amount of light. Given that the calibration of the machine learning model may have taken place on a different light source (even though it may have been of the same type or may have at least has a comparable light emission profile) or on the same light source but not under installation conditions, the signal received is, in one embodiment, normalised to account for differences in overall illumination strength during calibration and use respectively.

In the embodiment, a different in the light fingerprint's power of the detected light and of the calibration light source is determined and the difference is added to the received power at the specific location. For example, to predict the distance or angle with respect to the centre location of the light source, the power is calculated as $P_{RTEST}+(P_{RC1}-P_{RC2})$, wherein $P_{RTEST}$ is the power value collected at the specific location, $P_{RC1}$ is the power of the LED used in training the machine learning model at the centre location used to determine its ID, $P_{RC2}$: is the power of the LED identified in use at the centre location and $P_{RC1}-P_{RC2}$ is defined as the discussed offset in light signature. $P_{RC2}$ is known for each installed light source from an initial calibration of the installation comprising the light sources. Once the light source has been identified through its finger print, the relevant value is obtained from a database. The trained model is then provided with the thus corrected signal and in turn provides an estimated position of the current location of the mobile unit as an output. This is illustrated in the six circle from the left in FIG. 6.

Alternatively or additionally to the learning model based approach discussed above, the radial distance from and angular position relative to the point of the surface on which the mobile unit travels that receives the maximum amount of light is determined by received power at dominant wavelengths, utilizing either a single sensor unit or all of them, employing a visible light channel model such as the one disclosed by Kuo, Ye-Sheng, et al. "Luxapose: Indoor positioning with mobile phones and visible light." Proceedings of the 20th annual international conference on Mobile computing and networking. 2014, the entirety of which is herein incorporated by this reference. Both of these alternatives are illustrated in the rightmost dashed box in FIG. 7.

Figure 10:
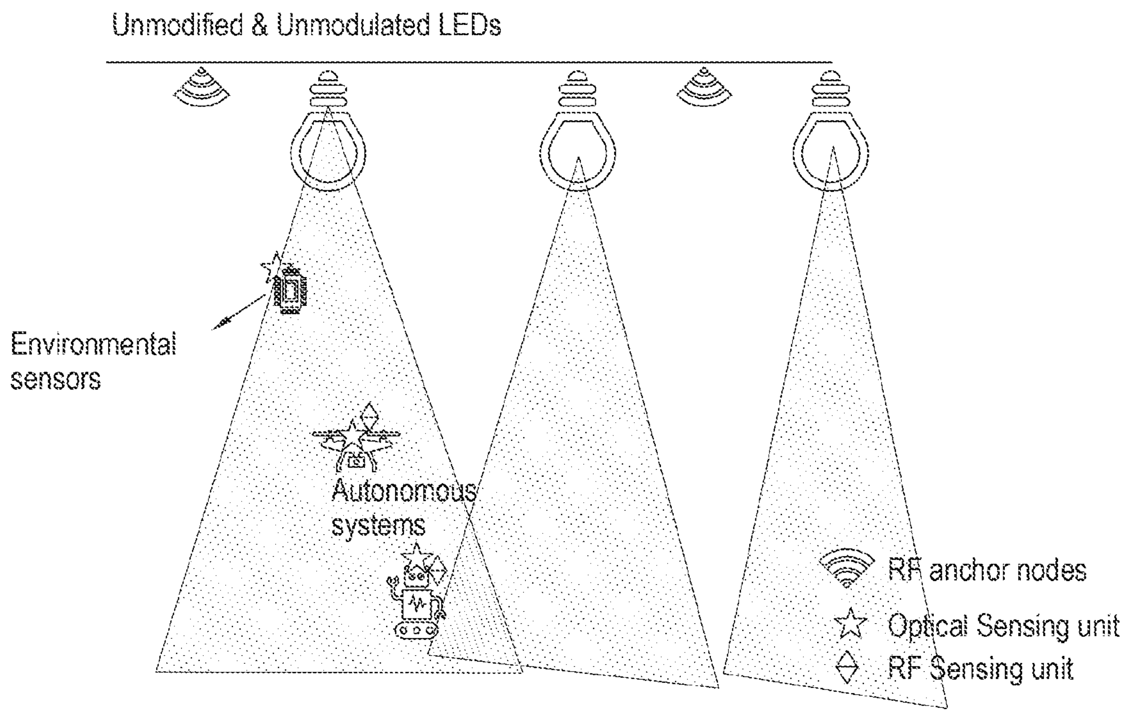
FIG. 10 shows illustrates an example of how an illumination system may be set up.

To enhance the accuracy of distance/angle estimation, irrespective of the nature of the method used in obtaining it, input from other sensors like IMU and gyroscope, etc, present on the device can be employed. If the machine learning model based approach is used, then in one embodiment the model outputs and estimation of the error associated with its own location prediction. This error is then, as is shown in the rightmost circular area of FIG. 6 either added to or subtracted from the previously obtained location estimate. To obtain the hereby generated final location estimate, the method determines if the error is to be taken into account at all and if so, how, based on the input from the other sensors. This last/error correction step is performed by the localization engine shown in FIG. 4 and illustrated in the final step shown in FIG. 7. FIG. 10 illustrates an example of how an illumination system may be set up to comprise RF anchor nodes and mobile units comprise RF sensing units that support the use of information sources other than visible light. Also shown in the figure is an environmental sensor. This sensor may be provided in the building to monitor environmental variables and to report the monitored values to a central monitoring unit. The environmental sensor is configured to determine its own position using the visible light localization method described herein.

The above discussed localization method initially identifies the light source under which the mobile unit is presently located before determining the position of the mobile unit within the area illuminated by the light source with improved precision. This corresponds to the top branch shown in FIG. 4.

Figure 11:
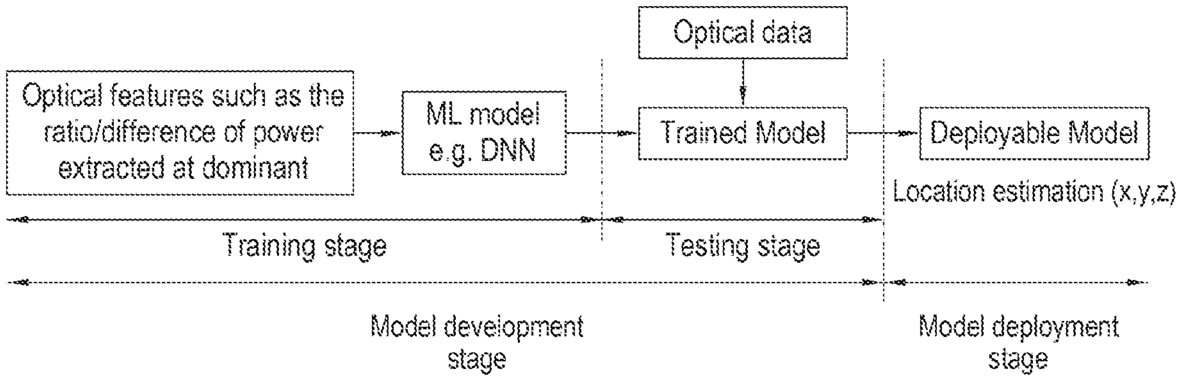
FIG. 11 shows a process diagram of localization machine model training and deployment using optical features.

FIG. 11 shows a process diagram of localization machine model training and deployment using optical features according to another embodiment according to the middle branch shown in FIG. 4. It will be noted that, in contrast to the above described method, the light signature of the light source is not used to identify the light source under which the mobile unit is presently located explicitly. Instead, the ratio of or differences between the power of the light source at the predetermined wavelength is used to initially train a machine learning model to predict a location of a mobile unit relative to the light source, test the trained model with the help of otherwise acquired data of the location of a mobile unit relative to the light source, such as the optical data indicated in FIG. 11 use the trained model in predicting the location of a mobile unit relative to the light source in use. It will be appreciated that optical data is also used as ground truth during the initial training. Although the present method does not include a step of expressly identifying the light source under which the mobile unit is presently located, the present method has the use of the ratio of or differences between the power of the light source at the predetermined wavelength (as opposed to the use of the full light spectrum or of absolute power values within it) in common with the previously described method.

It will be understood that the presence of ambient light and other light sources in use will introduce some interference. This said, it was found that this added interference is not significant (often below 10%), as the extracted light signature is inherently intrinsic in nature. In an embodiment, the model is, moreover, trained on various levels of light intensities and different conditions such as sensor blockage and shadows. In this manner the model acquires the ability to handle challenges encountered in light-based localization in use. This includes addressing limitations in low-light conditions, sensor blockages, and shadows caused by infrastructure.

Figure 12:
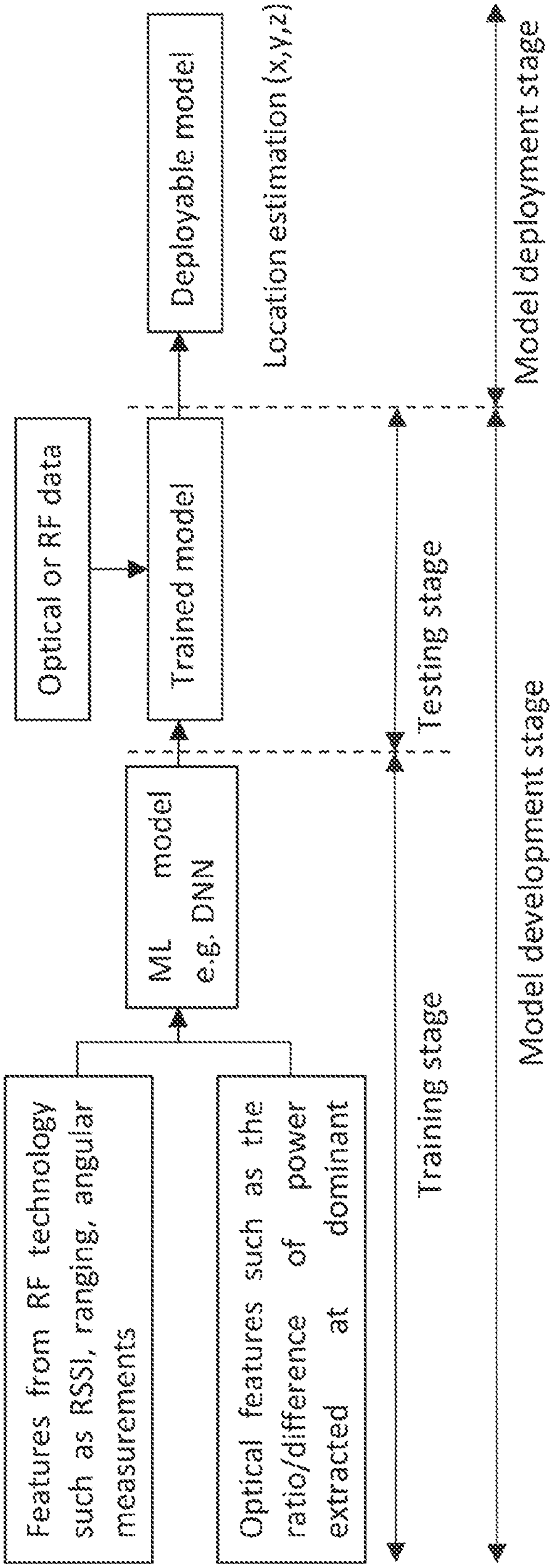
FIG. 12 shows a process diagram of localization machine model training and deployment using joint optical and radio features.
Figure 13:
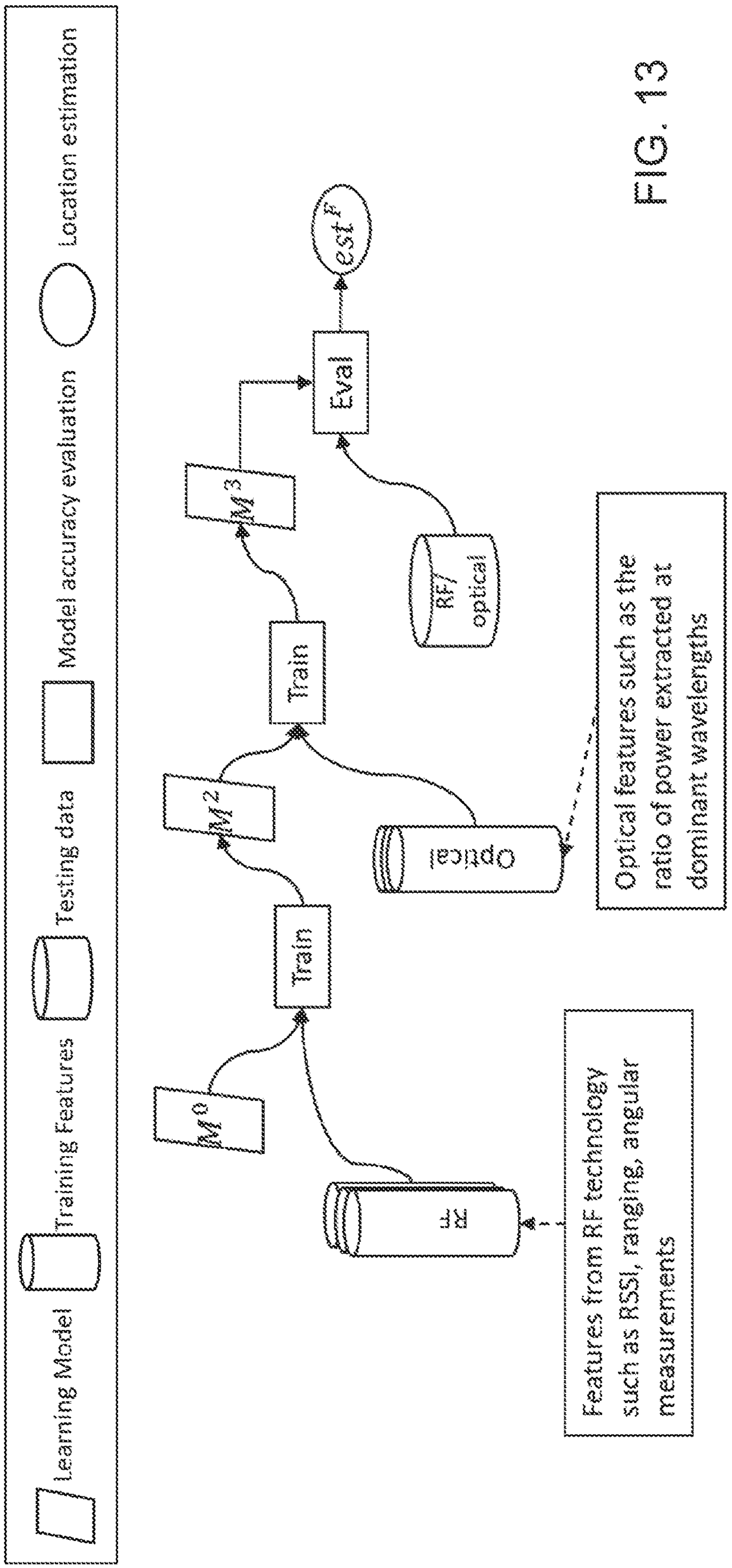
FIG. 13 shows a process diagram of an incremental machine learning model training and validation scheme for localization using joint optical and radio features.

In another embodiment, the extracted features/light signatures are combined with measurements from RF sources, improving the localization performance of RF systems. The optical signals described herein and the RF signals are, in the cascaded learning embodiment of FIG. 12 provided to the machine learning model (e.g. a DNN) jointly during training and use. Alternatively, the features are provided to the model in an incremental learning scheme as illustrated in FIG. 13 in which RF and optical features are fed into machine learning model at different training stage to improve the localization performance. It is believed that the incremental learning approach illustrated here reduces feature interference of different sources, as at any one stage, the machine learning is only affected by one signal feature.

The RF and optical information is nevertheless jointly/simultaneously applied during use of the model once trained, as also shown in FIG. 13. The use of RF signals as input to the machine learning model is represented in the bottom branch of FIG. 4.

Figure 14:
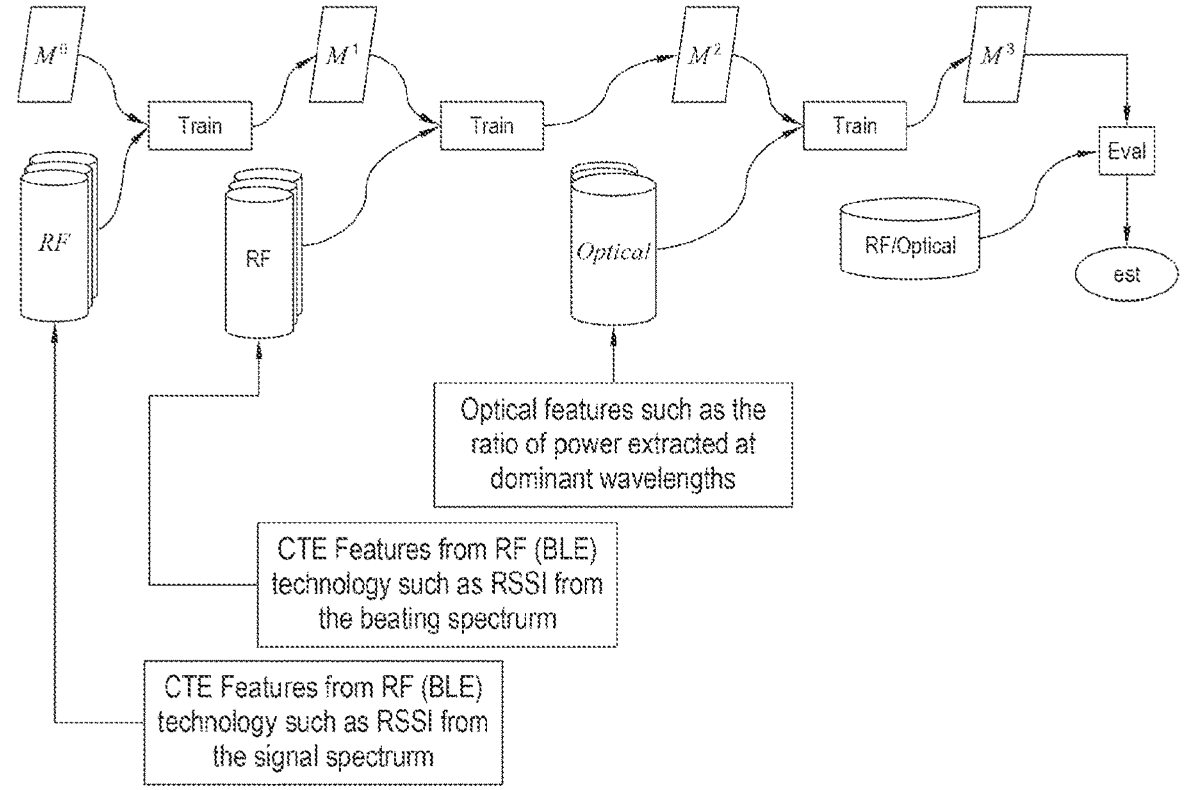
FIG. 14 shows an alternative process diagram of incremental localization machine model training and deployment using joint optical and radio features.

Yet another embodiment in which a machine learning model is trained is based in a cascading fashion on RF data from the signal and beating spectra as well as the above-described optical features is shown in FIG. 14. Expressed more generally, the optical and RF signals can be regarded as two observational modalities of the localization target, and the joint use of these two modalities can contribute to localization accuracy.

The proposed incremental learning frameworks discussed herein work in a step-by-step manner. In the first step, the RF or optical features are utilised to train a base model, which learns the knowledge of the signal-location mapping reflected in the RF or optical signal. In the second stage, the remaining optical or RF features are adopted to further train this learned base model. FIG. 14, for example, shows a learning-based localization techniques that improves localization performance of U.S. patent application Ser. No. 17/453,386 (the entirety of which is incorporated herein by reference). In FIG. 14, features from the signal spectrum are added in the first step of model training. In the next step the trained model further employs the features from the beating spectrum to learn/train. The trained model in the third stage further leverages the light signature features for training. With each learning stage, the method learns more and get finely tuned with more features regarding the location. The localization performance estimation is preferably also performed at each stage.

Figure 15:
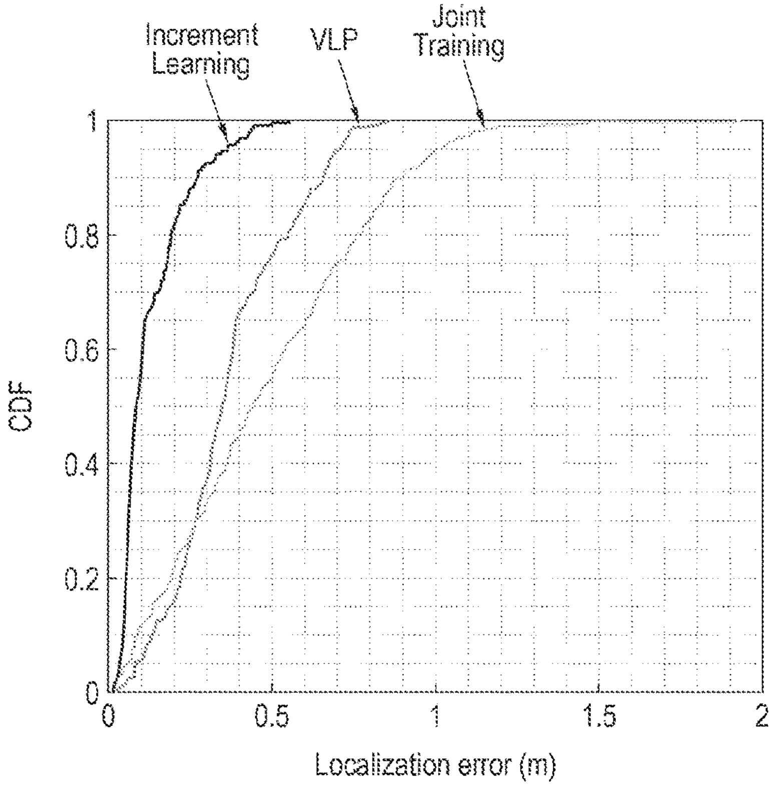
FIG. 15 shows the localization performance of different proposed techniques where x-axis represents localization error in meters and y-axis represents the cumulative distribution function (CDF) of the localization error.

FIG. 15 illustrates simulated results of cumulative distribution functions over localization errors achieved through use of a model trained using the incremental learning method shown in FIG. 13 or the joint training method shown in FIG. 12 and the method (VLP) shown in FIG. 11.

Some embodiments described herein offer several advantages:

Utilization of Existing LED Lights:

By leveraging unmodulated and unmodified LED lights as anchors, the proposed technique removes barriers to commercializing VLP systems. Since LEDs are widely available in indoor scenarios, this approach extracts intrinsic features from already installed lighting units, enabling seamless integration and widespread adoption.

Improved Localization Performance:

The fusion of intrinsic light features with RF technology enhances the localization performance beyond what is achievable with RF alone. The proposed technique achieves a significant improvement in accuracy, reaching a decimetre level, surpassing the limitations of RF-based localization techniques on their own.

Low-Power and Cost-Effective Solution:

The proposed method offers a low-power, cost-effective solution for implementing passive VLP systems in low-power IoT devices and autonomous systems. By utilizing power-efficient and affordable single-pixel light colour sensors as detectors, the overall complexity and cost are reduced while maintaining reliable location tracking capabilities.

Seamless Integration with Smart Building Management:

In the future, the proposed approach can be seamlessly integrated with smart building management sensing units, providing them with location awareness information. This integration enhances the overall intelligence and efficiency of building management systems.

Drift Reduction:

Drift in the movement of a mobile unit can be reduced by correcting a position determined by tracking the physical actions undertaken by the mobile unit by utilizing the peak power received from two light sources.

While certain arrangements have been described, they have been presented by way of example only, and are not intended to limit the scope of protection. The inventive concepts described herein may be implemented in a variety of other arrangements. In addition, various additions, omissions, substitutions and changes may be made to the arrangements described herein without departing from the scope of the invention as defined by the following claims.

The invention claimed is:

1. A method of detecting a location of a mobile unit, comprising:

using a light sensor, obtaining a plurality of pieces of spectral information of visible light the mobile unit is exposed to, the spectral information being obtained at a limited number of predetermined wavelengths, the mobile unit being in an environment lit by a plurality of light sources;

determining a signature of a light source independent from a distance or an angle between the light source and the sensor;

comparing the determined signature to previously stored signatures of the light sources and identifying a light source having a signature that has a minimum error relative to the determined signature in the stored signatures; and estimating a current location of the mobile unit as one of being at a known installation location of the identified light source or being proximate to the known installation location of the identified light source, wherein the signature is calculated by determining at least one of a ratio of powers provided by the light source at two or more of the predetermined wavelengths, or a difference of the powers provided by the light source at two or more of the predetermined wavelengths.

2. The method of claim 1, wherein the light sensor includes a sensing element that is directed in a vertical upward direction and at least one further sensing element that is oriented in a direction at an acute angle relative to the vertical upward direction and wherein the at least one further sensing element senses light emitted by a light source adjacent to the identified light source, the mobile unit being configured to reduce a size of the estimated current location based on the sensed senses-light emitted by a light source adjacent to the identified light source.

3. The method of claim 1, wherein the spectral information obtained at a limited number of predetermined wavelengths is obtained only at a red, a green and a blue wavelength or at red, green and blue wavelength bands.

4. The method of claim 1, wherein relationship between the plurality of the obtained pieces of spectral information is a difference between or a ratio of two spectral powers obtained at two different of the wavelengths.

5. The method of claim 1, wherein the mobile unit has access to a trained machine learning model configured to output location information within an area illuminated by the identified light source, wherein the estimating the current location includes using the trained machine learning model to generate location information of the location of the mobile unit within the area illuminated by the identified light source.

6. A method of detecting a location of a mobile unit comprising:

using a light sensor, obtaining a plurality of pieces of spectral information of visible light the mobile unit is exposed to, the spectral information being obtained at a limited number of predetermined wavelengths, the mobile unit being in an environment lit by a plurality of light sources;

generating a location estimate by inputting, as visible light information, the obtained plurality of pieces of spectral information into a trained machine learning model, wherein the mobile unit is configured to determine a signature of a light source independent from a distance of an angle between the light source and the sensor; and estimating a current location of the mobile unit as one of being at a known installation location of the identified light source or being proximate to the known installation location of the identified light source, wherein the signature is calculated by determining at least one of a ratio of powers provided by the light source at two or more of the predetermined wavelengths, or a difference of the powers provided by the light source at two or more of the predetermined wavelengths.

7. The method of claim 6, wherein the machine learning model is further trained to base location estimates on radiofrequency information in addition to the visible light information, and wherein generating the location estimate further comprises inputting radiofrequency information sensed at a current location of the mobile unit by an RF sensor of the mobile unit into the machine learning model.

8. A method of training a machine learning model comprising:

training a model capable to provide localization information based on radiofrequency measurements further using visible light information detected at a location and known location information of the location at which the visible light information was detected, the radiofrequency measurements being detected on tracked locations of a mobile unit, the visible light information including spectral information of visible light the mobile unit is exposed to, the localization information being derived based on a tracked current location of the mobile unit and from information of a known location of installation of an identified light source, wherein the mobile unit is configured to determine a signature of a light source independent from a distance or an angle between the light source and the sensor, compare the determined signature to previously stored signatures of the light sources and identify a light source having a signature that has a minimum error relative to the determined signature in the stored signatures, and estimate a current location of the mobile unit as one of being at a known installation location of the identified light source or being proximate to the known installation location of the identified light source, and wherein the signature is calculated by determining at least one of a ratio of powers provided by the light source at two or more of the predetermined wavelengths, or a difference of the powers provided by the light source at two or more of the predetermined wavelengths.

9. A mobile unit comprising the machine learning model trained according to the method of claim 8.

10. The method of claim 8, further comprising training the model to be capable to provide localization information based on radiofrequency measurements obtained at measurement locations and on location information of the measurement locations.

11. A mobile unit comprising a light sensor, the mobile unit configured to:

obtain a plurality of pieces of spectral information of visible light the mobile unit is exposed to, the spectral information being obtained at a limited number of predetermined wavelengths, the mobile unit being in an environment lit by a plurality of light sources;

determine a signature of a light source independent from a distance or an angle between the light source and the sensor;

compare the determined signature to previously stored signatures of the light sources and identify a light source having a signature that has a minimum error relative to the determined signature in the stored signatures; and estimate a current location of the mobile unit as one of being at a known installation location of the identified light source or being proximate to the known installation location of the identified light source, wherein the signature is calculated by determining at least one of a ratio of powers provided by the light source at two or more of the predetermined wavelengths, or a difference of the powers provided by the light source at two or more of the predetermined wavelengths.

12. The mobile unit of claim 11, wherein the light sensor includes a sensing element that is directed in a vertical upward direction and at least one further sensing element that is oriented in a direction at an acute angle relative to the vertical upward direction and wherein the at least one further sensing element senses light emitted by a light source adjacent to the identified light source, the mobile unit being configured to reduce a size of the estimated current location based on the sensed light emitted by a light source adjacent to the identified light source.

13. The mobile unit of claim 11, wherein the spectral information obtained at a limited number of predetermined wavelengths is obtained only at a red, a green and a blue wavelength or at red, green and blue wavelength bands.

14. The mobile unit of claim 11, wherein relationship between the plurality of the obtained pieces of spectral information is a difference between or a ratio of two spectral powers obtained at two different of the wavelengths.

15. The mobile unit of claim 11, wherein the mobile unit has access to a trained machine learning model configured to output location information within an area illuminated by the identified light source, wherein the estimating the current location includes using the trained machine learning model to generate location information of the location of the mobile unit within the area illuminated by the identified light source.

16. A mobile unit comprising a light sensor and configured to:

obtain a plurality of pieces of spectral information of visible light the mobile unit is exposed to, the spectral information being obtained at a limited number of predetermined wavelengths, the mobile unit being in an environment lit by a plurality of light sources;

generate a location estimate by inputting, as visible light information, the obtained plurality of pieces of spectral information into a trained machine learning model;

determine a signature of a light source independent from a distance or an angle between the light source and the sensor; and estimate a current location of the mobile unit as one of being at a known installation location of the identified light source or being proximate to the known installation location of the identified light source, wherein the signature is calculated by determining at least one of a ratio of powers provided by the light source at two or more of the predetermined wavelengths, or a difference of the powers provided by the light source at two or more of the predetermined wavelengths.

17. The mobile unit of claim 16, wherein the machine learning model is further trained to base location estimates on radiofrequency information in addition to the visible light information, and wherein generating the location estimate further comprises inputting radiofrequency information sensed at a current location of the mobile unit by an RF sensor of the mobile unit into the machine learning model.

* * * * *